United States Patent [19]

Maier et al.

[11] Patent Number: 5,217,102
[45] Date of Patent: Jun. 8, 1993

[54] STORAGE SYSTEM

[75] Inventors: Dieter Maier, Stuttgart; Dieter Boley, Leonberg/Eltingen, both of Fed. Rep. of Germany

[73] Assignee: Fraunhofer Gesellschaft zur Forderung der angewandten Forschung e.V., Munich, Fed. Rep. of Germany

[21] Appl. No.: 643,513

[22] Filed: Jan. 18, 1991

Related U.S. Application Data

[63] Continuation-in-part of Ser. No. 549,637, Jul. 6, 1990, Pat. No. 5,005,689, which is a continuation of Ser. No. 474,634, Jan. 30, 1990, abandoned, which is a continuation of Ser. No. 160,210, Feb. 25, 1988, abandoned.

[30] Foreign Application Priority Data

Feb. 27, 1987 [DE] Fed. Rep. of Germany ....... 3706493

[51] Int. Cl.$^5$ ............................................. B65G 1/00
[52] U.S. Cl. .................................. 198/347.3; 198/750
[58] Field of Search ..................... 198/347.3, 750, 434; 414/416, 417

[56] References Cited

U.S. PATENT DOCUMENTS

| | | | |
|---|---|---|---|
| 1,925,502 | 9/1933 | Schaeffer | 198/434 |
| 3,279,148 | 10/1966 | Henn | 198/750 |
| 4,475,643 | 10/1984 | Klingenberg | 198/347.3 |
| 4,509,634 | 4/1985 | Payne | 198/347.3 |
| 5,005,689 | 4/1991 | Maier et al. | 198/750 |

FOREIGN PATENT DOCUMENTS 3438123 4/1986 Fed. Rep. of Germany ... 198/347.3

Primary Examiner—Joseph E. Valenza
Attorney, Agent, or Firm—Kalish & Gilster

[57] ABSTRACT

A storage system for sequent and positioned input, storage and removal of items arranged on a carrier, includes a first container for full carriers and a second container for empty carriers. The carrier is a conveyor belt, the ends of which are attached to shafts, and which can be wound up upon these shafts together with the items on the conveyor belt. The conveyor belt is composed of individual rigid segments, which are flexibly joined to each other by a joining device, and each of which is a storage device for at least one item. A forward transport unit moves the conveyor belt in such a manner that a new item can be stored or removed from one loading and unloading station and the conveyor belt is unwound from one shaft and rewound on the other shaft. The shafts are arranged in a container in a type of cassette. The system has the advantage that it requires only one loading and unloading station and that the process can be readily automated.

6 Claims, 4 Drawing Sheets

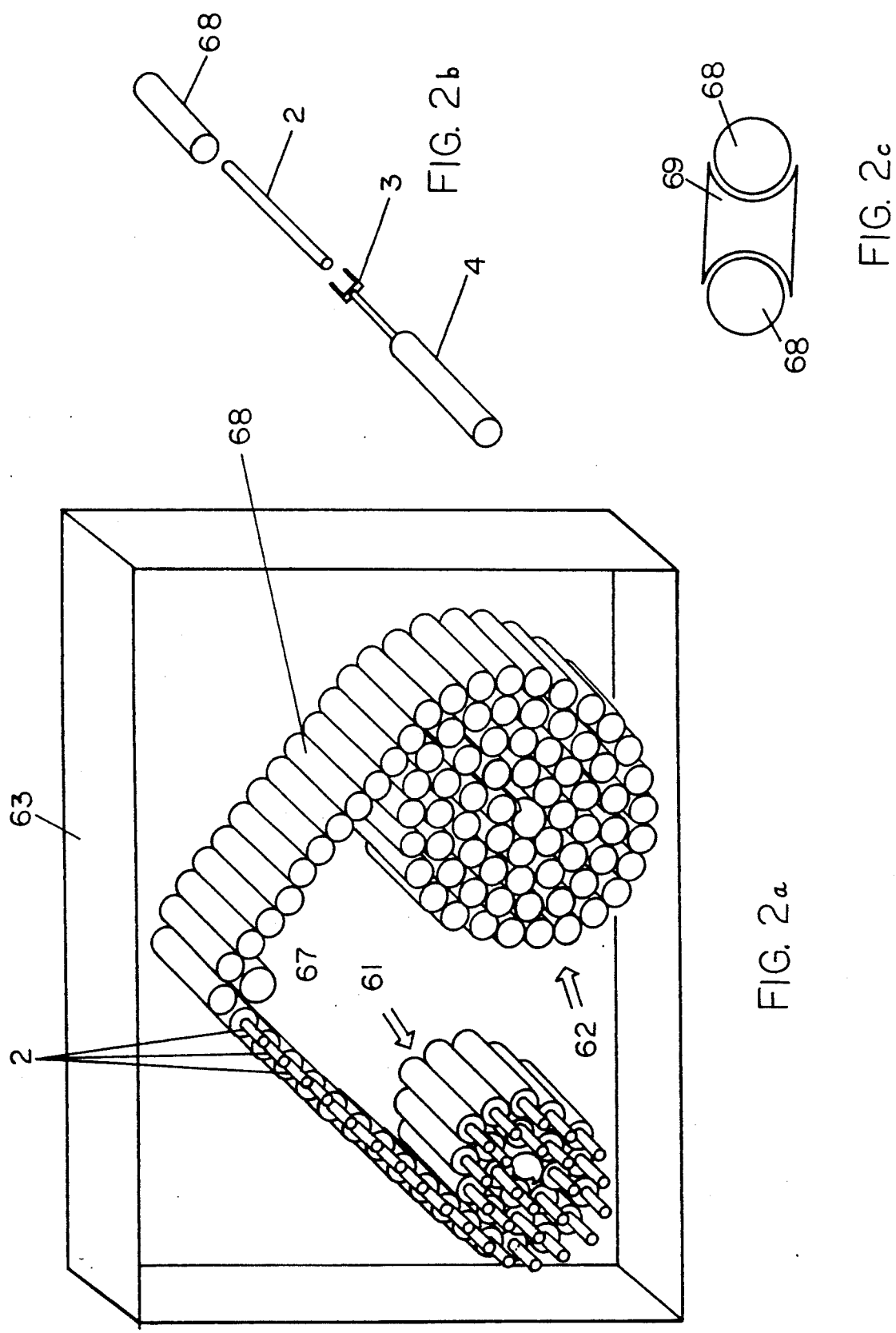

STORAGE SYSTEM

CROSS-REFERENCE TO RELATED APPLICATION

This is a continuation-in-part of application Ser. No. 07/549,637, filed Jul. 6, 1990, now U.S. Pat. No. 5,005,689, which is a continuation of application Ser. No. 07/474,634, filed Jan. 30, 1990, abandoned, which is a continuation of application Ser. No. 07/160,210, filed Feb. 25, 1988, abandoned, deriving from and claiming priority of German Federal Republic application No. P 37 06 493.2, dated Feb. 27, 1987.

BACKGROUND AND SUMMARY OF THE INVENTION

The present invention relates to a storage system for a sequent, positioned input, storage and removal of items arranged on a carrier.

PRIOR ART

Storage systems of this type are suitable for storing items of any kind, in particular, however, for storing pliable, limp items as well as brittle and fragile ones and those having sensitive surfaces.

In prior art storage systems the items are, by way of illustration, accommodated on pallets, which for their part are stacked on top of each other in a container.

For this reason, in order to remove items, it is necessary to remove one pallet after the other from the container, process the removed pallet in order of its position and put the empty pallet, by way of illustration, into another container. When the items are to be put in, the task is reversed.

The prior art storage systems are, therefore, only suitable to a limited extent for automatic loading and removal, by way of illustration, with a handling device: both removal of the pallets from the container and processing the pallets requires changing the position of the handling device according to the size of the pallet and the items as well as of the number of pallets in the container. Thus the loading and the removal processes require complex and variable motions, so that an automatically run operation is, by way of illustration, hardly feasible to process the pallets on which items of different size and/or kind are stored without complex identification systems.

An object of the present invention is to provide a storage system for sequent, positioned input, storage and removal of items arranged on a carrier, in which input and removal of the stored items can be easily automated.

A solution of this object in accordance with the present invention is described together with embodiments thereof in the patent claims hereto.

According to the invention the carrier is a conveyor belt, the ends of which are attached to shafts, and which can be wound up onto these shafts together with the items on the conveyor belt. Further the conveyor belt is composed of individual rigid segments, which are flexibly joined to each other by joining means, and each of which is a storage means for at least one item. A forward transport unit moves the conveyor belt in such a manner that a new item can be stored or removed from one loading and unloading station and that the conveyor belt is unwound from one shaft and rewound on the other shaft. The shafts are arranged in a container in a type of cassette.

An inventive element it that the carrier employed is not a pallet but a conveyor belt which is wound from one roll to another for putting items into the storage system or removing them. Between the two rolls is the loading or unloading station, where items are removed from the conveyor belt or put on it.

In this manner, one single loading/unloading station suffices for the invented storage system. Moreover, the invented storage system has the advantage that the unwinding of the "roll" and the immediate rewinding into another "roll" only requires the most rudimentary rotary motions.

The invented storage system thus has a number of advantages over conventional storage systems:

The storage system has the advantage that each storage site is in itself rigid in such a manner that, in particular, brittle or fragile items can be safely stored.

The invented stage system only needs a single loading or and unloading station, thus, the invented storage system requires no complex motions for putting items into and removing items from the storage system.

Moving the conveyor belt forward and rewinding it require only the most rudimentary rotary motions.

The invented storage system is also suitable for storing items of different sizes for all the items can be put in and removed from the same place regardless of their size.

In each roll, the item to be stored is flexibly enveloped by the conveyor belt or the underside of the wound part of the conveyor belt above it in such a manner that the items to be stored are protected.

The present invention is made more apparent in the following with the use of further embodiments and with reference to the attached drawings, in which:

FIG. 2a and 2b show a further embodiment, and FIG. 2c the conveyor belt.

FIG. 1a and 1b depict two embodiments of a storage system according to the invention.

Figure 1A:
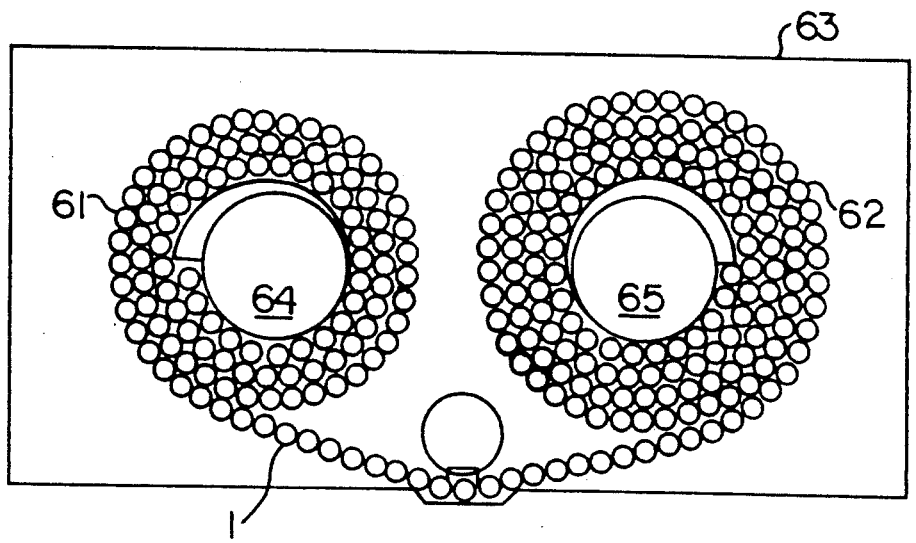
FIG. 1a and 1b show two embodiments of a storage system according to the invention.

The storage system is provided with a conveyor belt 1, the ends of which are attached to shafts 64 and 65 respectively. Both shaft 64 and 65 are arranged in a container 63 of cassette type. By winding conveyor belt 1 onto shaft 64 and corresponding unwinding it from shaft 65, the conveyor belt is moved past a loading and unloading station 66, in such a manner that loading and unloading of the conveyor belt can ensue from a fixed place without requiring variable positioning of the unit to be removed.

Figure 1B:
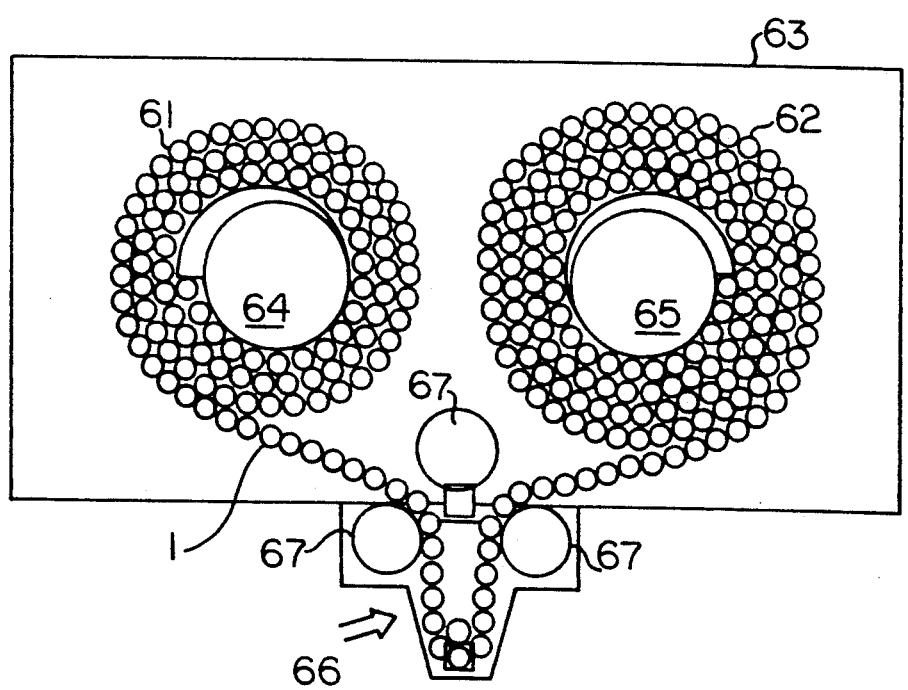

Contrary to the embodiment shown in FIG. 1a, the embodiment illustrated in FIG. 1b has the loading and unloading station 66 arranged outside of the cassette 63 by means of several guide rollers 67.

It can be plainly seen that the shafts 64 and 65 have a "spiral-shaped cross-section", resulting in a round roll. In order to be able to move the conveyor belt completely out of the container 63, it is advantageous, if the conveyor belt 1 is attached to shaft 64 and 65 respectively via a roll-out band, which "bridges" the distance between the opening for the conveyor belt and shaft 64 and 65.

The conveyor belt is composed of individual segments 68, which are flexibly joined by joining means 69 like hinges or clamps (s. FIG. 2c). In this manner substantially fixed storage sites can be attained and, on the other hand, storage capacity can be varied as desired. Each individual segment is preferred to be a hollow body, the front face and/or back face of which are open.

In a preferred embodiment the individual segments are pipe-like objects or cylindrical tubes in which axially symmetrical items can be stacked on top of each other.

FIG. 2a depicts an embodiment according to FIG. 1a; the drawing shows a cassette storage system without the necessary front cover of the container 63. The view into the inside of the storage system shows that the tubes 68 have not the same length as the items 2 stored therein. It is sufficient that the co-ordination of the different lengths of the storage tubes 68 and the items 2 functions in a way that the items do not fall out of the tubes in which they are carried. The front of the cassette (not shown in the drawing) ensures that the items do not fall out of the tubes, as already shown in the present embodiments of the cassette storage system.

The special advantage of this embodiment is that because the items look (or extend) out of the open tubes they can be directly gripped at the removal point of the cassette by active sliders or a gripping device 3 and a simple drive unit for example a compressed-air cylinder 4 and can be put into another handling process in an exact position (s. FIG. 2b). Thus the items can be removed and at the same time the storage system can directly be charged by means of this gripping device. A special input and output device or other injection and ejection device is no longer necessary.

Figure 3A:
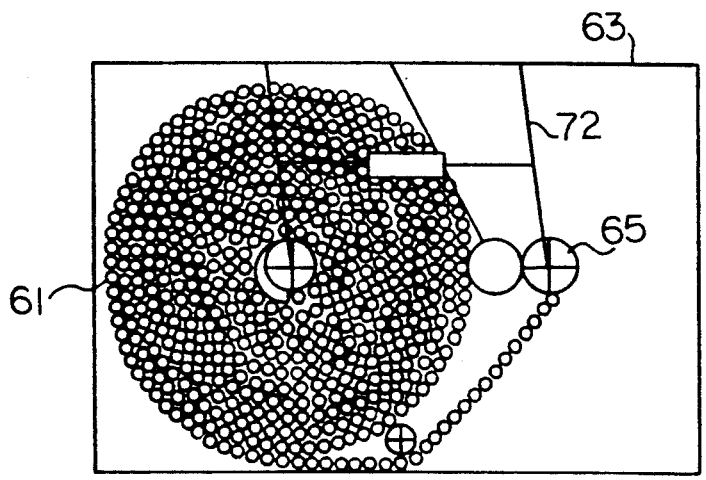
FIG. 3a and 3c show a further embodiment, having flexible suspended shaft bearings.
Figure 3B:
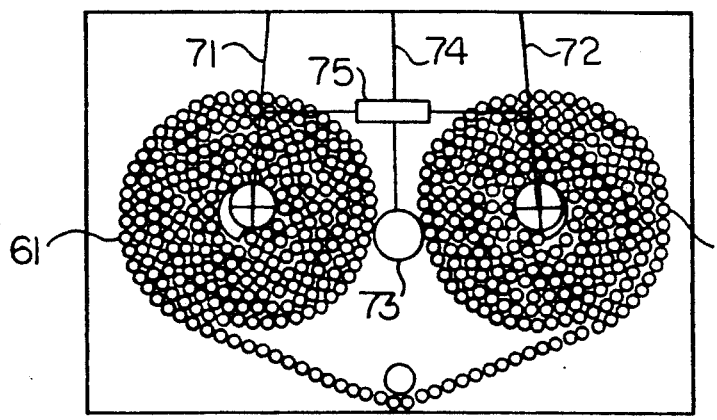

In the embodiment depicted in FIG. 3, in contrast to the embodiments presented in FIG. 1a and 1b, shafts 64 and 65 of the two rolls 61 and 62 are not fixed, but are arranged on flexible levers 71 and 72 in such a manner that they can be moved. By this means the available storage volume is better exploited, as illustrated in FIGS. 4a and 4b. Moreover, FIG. 4a shows that with certain outer dimensions, which are indicated in the figures, by way of illustration, with 80 ME (measuring units) and 120 ME, rolls 61 and 62, having a diameter of 56 ME would already overlap if shafts 64 and 65 were arranged in such a manner that the biggest possible diameter is 80 ME. In the embodiment presented in FIG. 3b, in which shafts 64 and 65 are arranged in such a manner that they can be moved by means of flexible levers 71 and 72, there is room in the cassette 63 for two rolls wit a diameter of 56 ME.

Figure 3C:
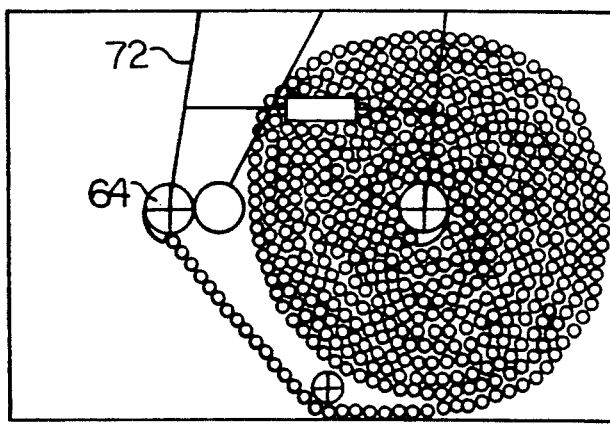
Figure 4A:
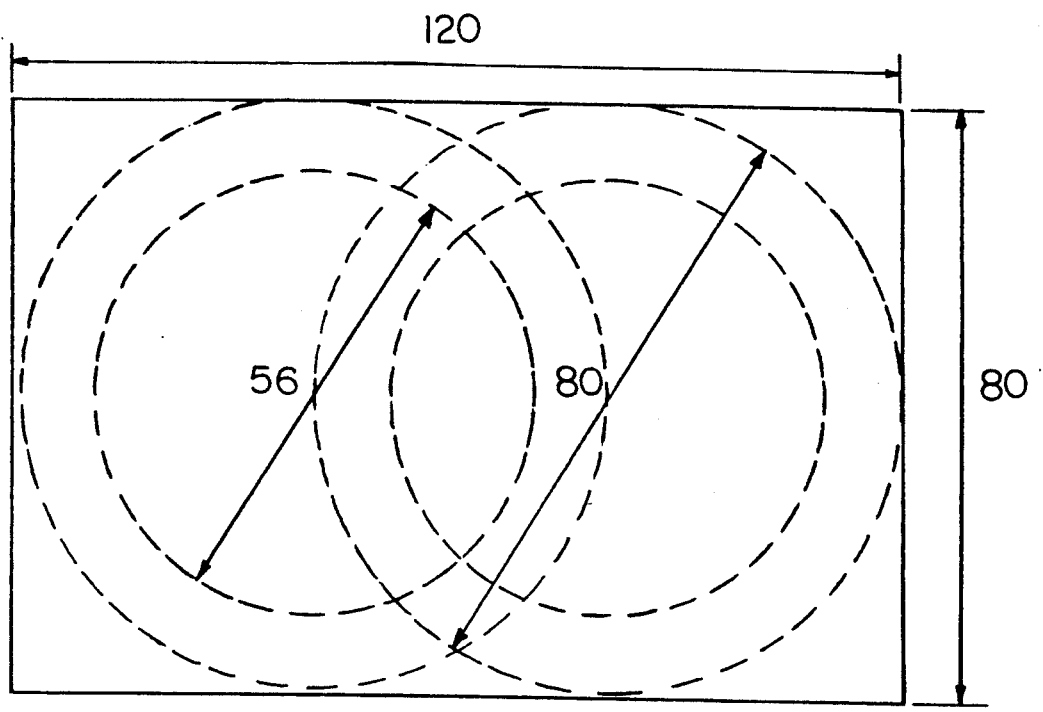
FIG. 4a and 4b show a comparison of the storage volume.
Figure 4B:
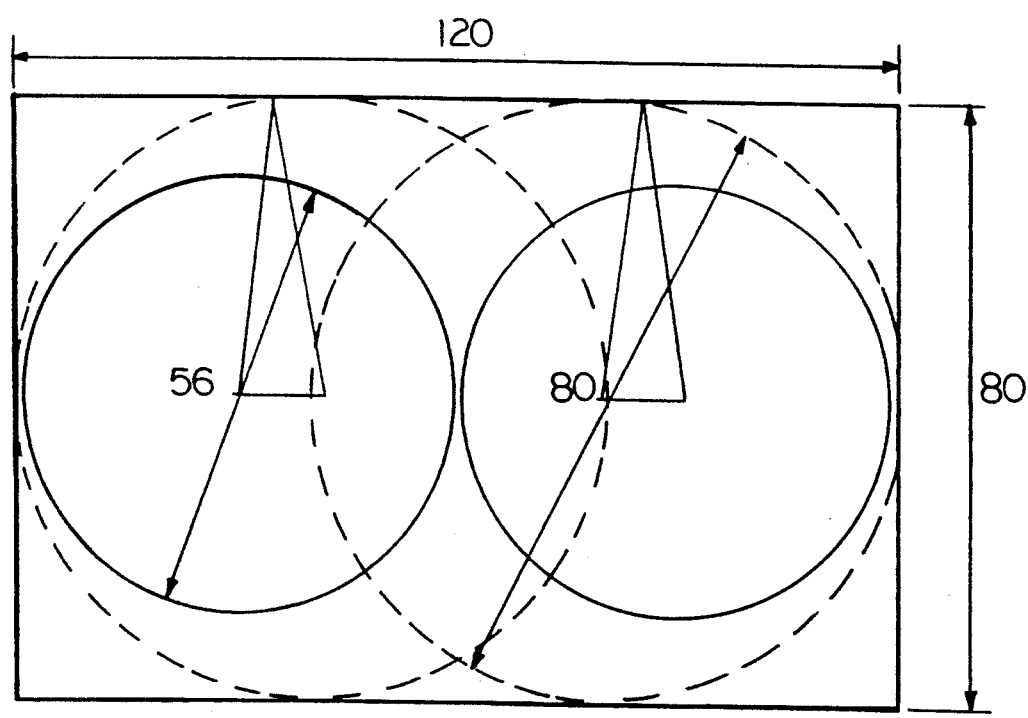

Furthermore, in FIGS. 3a to 3c, a brake element is provided in the form of roller 73, which, in the case of flexible, suspended shafts, adjusts the peripheral velocity of the two rolls to each other during winding or unwinding in such a manner permitting even winding and unwinding of the individual rolls. For this purpose, brake element 73 is also borne on a flexible lever or crossarm 74, which is connected via a spring 75 to the two flexible levers or bearing rods 71 and 72 of rolls 61 and 62.

The "cassette storage system" depicted in FIGS. 1 to 4 has the additional advantage that easy transport is possible, by way of illustration, with a forklift or a ground conveyor vehicle. Moreover, due to the closed unit, only minimum preparation time for operation is required. Unloading or loading the storage system may preferably ensue by means of turning the storage system and gravity.

Furthermore, it is possible to operate the storage system horizontally as well as vertically. Moreover, the storage system may be turned upside down in such a manner that the last entered items are given out first.

In any case, a universally applicable storage system is attained, which requires only very rudimentary motions for loading and unloading and still has nearly 75% storage capacity of a square container.

By way of illustration, the individual containers or even the entire storage system, which is composed of two roll storage and a forward transport mechanism, which form a rigid unit, can be provided with suitable extrusions in order that they can be stacked with other roll storage systems. Furthermore, the containers may also be stacking containers.

Moreover, a suitable numbering or coding of the individual storage sites is possible. With a code reader in the timed forward transport area, any desired storage site can be reached with reverse operation.

On the other hand, the invented roll storage system depicted in FIG. 1 only requires the most rudimentary rotary motions by which the conveyor belt is wound on one roll and off the other.

The drive elements for moving the rolls can also be coupled to the cassette from the outside. In another embodiment, the individual cassettes can also be constructed in such a manner that they can be stacked.

What is claimed is:

1. A storage system for sequent and positioned input, storage and removal of items arranged on a carrier, the storage system comprising:
   a carrier formed of a conveyor belt, the ends of which are attached to shafts, and which can be wound up onto these shafts together with the items on the conveyor belt, the conveyor belt being composed of individual rigid cylindrical hollow body segments having open front and/or back faces which are flexibly joined to each other by distinct joining means, each of which individual rigid cylindrical, hollow body segments is a storage means for at least one item,
   loading and unloading means provided in loading and unloading stations,
   a forward transport unit for moving the conveyor belt in such a manner that a new item can be stored or removed from one loading and unloading station and that the conveyor belt is unwound from one shaft and rewound onto the other shaft, the shafts and conveyor belt thereon being arranged in a cassette-type container, and
   a cover provided in the loading and unloading station area, which permits access to only one cylindrical hollow body of said conveyor belt.

2. A storage system according to claim 1, wherein the loading and unloading means include a gripping device for items moved by a piston/cylinder unit.

3. A storage system according to claim 1, wherein the cylindrical hollow bodies are not as long as the items stored therein.

4. A storage system according to claim 1, wherein said conveyor belt is connected to said shafts by roll-out bands.

5. A storage system according to claim 1, wherein said shafts have a spiral-shaped cross-section in order to yield a rounder roll.

6. A storage system according to claim 1, wherein the distinct joining means are clamp-shaped.

* * * * *